United States Patent [19]

Ibata

[11] Patent Number: 4,564,726
[45] Date of Patent: Jan. 14, 1986

[54] PULSE/DIRECT CURRENT TRANSMITTING CIRCUIT IN A KEY TELEPHONE SYSTEM

[75] Inventor: Kazuo Ibata, Kawasaki, Japan

[73] Assignee: Nitsuko Limited, Kanagawa, Japan

[21] Appl. No.: 614,230

[22] Filed: May 25, 1984

[30] Foreign Application Priority Data

Dec. 27, 1983 [JP] Japan .............................. 58-250322

[51] Int. Cl.$^4$ .................. H04Q 5/00; H04M 19/00
[52] U.S. Cl. ...................... 179/99 M; 179/99 R; 179/81 R; 179/77
[58] Field of Search ............... 179/99 M, 99 R, 99 A, 179/99 LC, 70, 77, 18 FA, 18 AD, 16 A, 16 AA, 2 BC, 81 R

[56] References Cited

U.S. PATENT DOCUMENTS

| | | | |
|---|---|---|---|
| 3,997,738 | 12/1976 | Korsky et al. | 179/99 M X |
| 4,064,366 | 12/1977 | Wheatley et al. | 179/2 R |
| 4,092,501 | 5/1978 | Suzuki et al. | 179/99 M |
| 4,118,603 | 10/1978 | Kumhyr | 179/16 E |
| 4,125,749 | 11/1978 | Kinoshita et al. | 179/99 M |
| 4,184,054 | 1/1980 | Shibata et al. | 179/99 M |
| 4,234,765 | 11/1980 | Sekiguchi et al. | 179/99 M |
| 4,381,427 | 4/1983 | Cheal et al. | 179/2 DP |
| 4,412,102 | 10/1983 | Ogawa et al. | 179/99 M |
| 4,425,512 | 1/1984 | Tomooka et al. | 307/138 |
| 4,536,615 | 8/1985 | Kimijima et al. | 179/81 B |

Primary Examiner—Gene Z. Rubinson
Assistant Examiner—Elio DiVito
Attorney, Agent, or Firm—Burns, Doane, Swecker & Mathis

[57] ABSTRACT

A pulse data signal and a DC power signal are transmitted over a pair of transmission lines interconnecting a main operating unit and telephone sets in a key telephone system. The main operating unit and each telephone set includes a pulse transmitting and receiving circuit and a transformer having a core and first and second pairs of opposed windings. The individual windings in the first winding pair are connected to input and output terminals, respectively, of the pulse transmitting and receiving circuit. One terminal of each individual winding in the second winding pair is connected to a transmission line. A DC power source is connected across the other winding terminals in the second winding pair in the main operating unit. In the telephone set, the other winding terminals in the second winding pair are connected with a power supply circuit which provides power to various component circuits in the telephone set. A capacitor is connected across the terminals connected with the power supply circuit in order to prevent the DC power signal from short-circuiting from the DC power source in the main operating unit to the power supply circuit in the telephone set.

5 Claims, 4 Drawing Figures

PULSE/DIRECT CURRENT TRANSMITTING CIRCUIT IN A KEY TELEPHONE SYSTEM

BACKGROUND OF THE INVENTION

This invention relates to a pulse/direct current transmitting circuit used in key telephone systems.

A telephone system adapted to transmit both pulse data and DC power generally comprises a main operating unit and a plurality of key telephone sets connected to the main unit and respectively containing a central processing unit (hereinafter referred to as "CPU"). Further, the key telephone system requires, in addition to lines necessary for transmission of voice signals for speech, lines for inter-CPU data transmission and for power supply to the respective telephone sets. Since the system becomes complicated when the data transmission lines and DC power supply lines are provided separately, there has been used a circuit which generally employs the same lines for transmitting both data-transmitting pulses and power-supplying direct current, which is referred to as a pulse/direct current transmitting circuit.

DISCLOSURE OF PRIOR ART

A typical one of conventional pulse/direct current transmitting circuits of the type referred to above is shown in FIG. 1, wherein a main unit M is connected to each telephone set H through lines 11 and 12 for the transmission of pulse and direct current. More specifically, a pulse transmitting and receiving circuit TR1 in the main unit M provides pulses to a pulse transmitting and receiving circuit TR2 in the telephone set H through windings W1 and W2 of a transformer T1, capacitors C1 and C2, lines 11 and 12, capacitors C3 and C4 and windings W5 and W4 of a transformer T2. On the other hand, the circuit TR2 in the telephone set H sends, pulses to the circuit TR1 of the main unit M through another winding W6 and the winding W5 of the transformer T2, capacitors C3 and C4, lines 11 and 12, capacitors C1 and C2 and winding W2 and another winding W3 of the transformer T1. A direct current applied to power source terminals P1 and P2 is supplied through inductances L1 and L2 provided in the main unit M and further through inductances L3 and L4 provided in the telephone set H, to a power supply circuit PS for supplying the power to respective component circuits of the telephone set H.

In the above arrangement, the inductances L1, L2 and L3, L4 in the main unit M and telephone set H are effective to prevent the pulses transerred between the transmitting and receiving circuits TR1 and TR2 for being attenuated due to low impedance on the power supply circuit side, and the provision of the capacitors C1, C2 and C3, C4 also in the unit M and set H is effective to prevent the direct current supplied from the source terminals P1 and P2 to the power supply circuit PS from being short-circuited at the windings W2 and W5 of the transformers T1 and T2.

However, the arrangement of FIG. 1 has several disadvantages. For example, the use of many capacitor and inductance elements results in a high cost, and miniaturization of these electric elements is limited even with recent developments in solid-state electronics. Thus, miniaturization of the overall transmitting circuit is limited.

OBJECT OF THE INVENTION

A primary object of the present invention is, therefore, to provide a pulse/direct current transmitting circuit in a key telephone system, which is sufficiently minimized both in cost and size by remarkably reducing the number of required electric elements, specifically the number of elements limited in their own miniaturization.

This object of the present invention can be attained by arranging the transmitting circuit specifically to have a part of transformer windings provided also with an inductance function and any short-circuit of supplied power from occurring at the windings by means of a single capacitor employed.

Other objects and advantages of the present invention shall become clear from the following description of the invention detailed with reference to preferred embodiments illustrated in the accompanying drawings.

While the present invention shall now be disclosed with reference to the illustrated embodiments, the intention is not to limit the invention only thereto but rather to include all alterations, modifications and equivalent arrangements possible within the scope of appended claims.

DISCLOSURE OF PREFERRED EMBODIMENT

Figure 2:
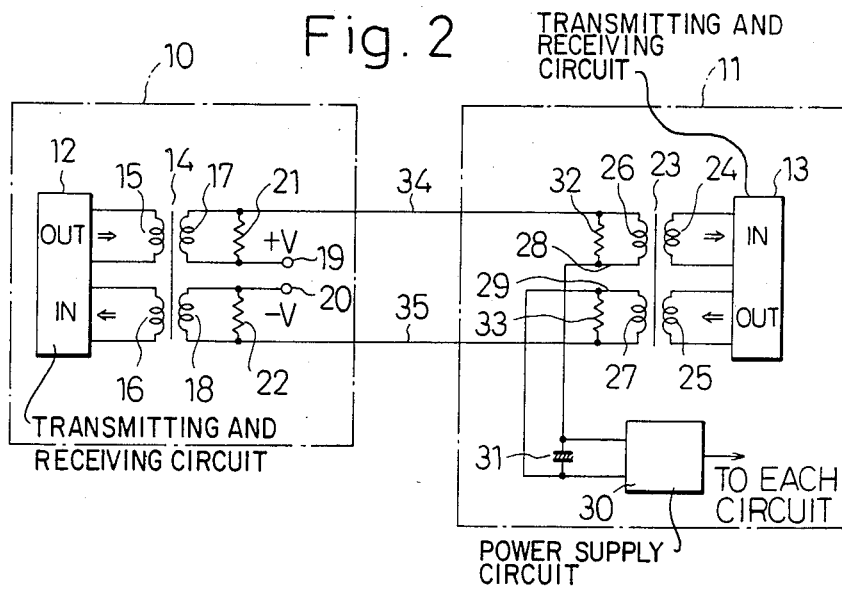
FIG. 2 shows an embodiment of a pulse/direct current transmitting circuit in a key telephone system in accordance with the present invention.

Referring now to FIG. 2, a main operating unit 10 and telephone set 11 include pulse transmitting and receiving circuits 12 and 13, respectively, for transmitting and receiving input and output data of CPU and the like. The transmitting and receiving circuit 12 of the main unit 10 is connected at its output terminals OUT to a winding 15 of a transformer 14 and at its input terminals IN to another winding 16 of the same transformer. Opposed to these windings 15 and 16 of the transformer 14, there are provided also windings 17 and 18, DC voltages $+V$ and $-V$ are applied respectively to terminals 19 and 20 of the windings 17 and 18, and resistances 21 and 22 are connected in parallel to each of the windings 17 and 18, respectively.

The transmitting and receiving circuit 13 incorporated in the telephone set 11, on the other hand, is connected at its input terminals IN to a winding 24 of a transformer 23 and at its output terminals OUT to another winding 25 of the same transformer. Opposed to these windings 24 and 25 of the transformer 23, there are provided windings 26 and 27 which are connected at terminals 28 and 29, respectively, to a power supply circuit 30, and a capacitor 31 is connected between terminals 28 and 29. Resistances 32 and 33 are connected in parallel to each of the windings 26 and 27, respectively, and lines 34 and 35 connect respectively the other end of the winding 17 of the transformer 14 to the other end of the winding 26 of the transformer 23 and the other end of the winding 18 of the transformer 14 to the other end of the winding 27 of the transformer 23.

The above explanation has been made as to only one of a plurality of telephone sets connected to the main unit 10, but other telephone sets are similarly connected to the unit. It will be also appreciated that, in addition to the lines 34 and 35, lines (not shown) for transmission of voice signals for speech are wired between the main unit 10 and the telephone set 11.

In operation, when a pulse voltage for data transmission is applied from the transmitting and receiving circuit 12 of the main unit 10 to the winding 15 of the transformer 14, a pulse voltage is induced in the opposed windings 17 and 18 and transmitted through the lines 34 and 35 to the windings 26 and 27 of the transformer 23 in the telephone set 11, so that a pulse voltage induced in the opposed winding 24 is detected by the transmitting and receiving circuit 13 of the telephone set 11. On the other hand, a pulse voltage transmitted from the transmitting and receiving circuit 13 of the telephone set 11 through the winding 25 of the transformer 23 is supplied to the transmitting and receiving circuit 12 of the main unit 10 substantially in the same manner. Further, when a DC voltage is applied between the one side ends 19 and 20 of the windings 17 and 18 in the transformer 14, a direct current flows in a closed loop including the winding 17, line 34, winding 26, power supply circuit 30, winding 27, line 35 and winding 18 so that a DC power will be supplied to the circuit 30. This power supply circuit 30 preferably comprises, for example, a switching regulator or the like which can drop such a relatively high input DC voltage as 30 V to such a required DC voltage as 5 V for the circuit operation and can supply it to the respective circuits in the telephone set 11.

Figure 1:
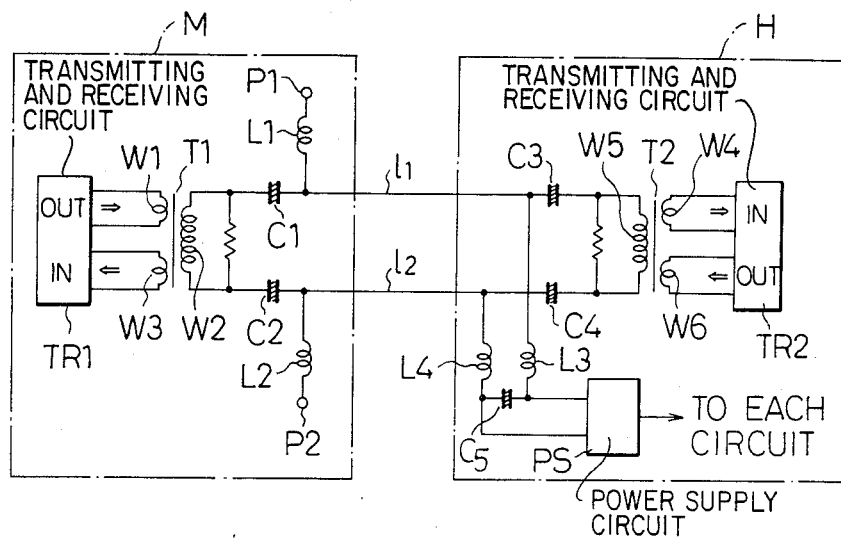
FIG. 1 shows a known pulse/direct current transmitting circuit of key telephone system such as that described above.

For the capacity and so on of the capacitor 31 and within the power supply circuit 30, they are designed to have a sufficiently small AC impedance component, and thus there can be formed an AC circuit of a closed loop including the windings 17 and 18 of the transformer 14, lines 34 and 35, windings 26 and 27 of the transformer 23 and capacitor 31. In addition, since the DC power is to be supplied through the windings 17 and 18 which serve as inductances for AC power, the data-transmitting pulse can be effectively transmitted without any trouble through the above AC circuit of closed loop between the transmitting and receiving circuits 12 and 13, substantially in the same manner as in the arrangement of FIG. 1. Further, any short-circuiting of the DC circuit from the terminals 19 and 20 of the windings 17 and 18 to the power supply circuit 30 can be avoided by the capacitor 31 and, in this respect, too, substantially the same effect as in the case of FIG. 1 can be realized.

Further, the resistances 21, 22 and 32, 33 inserted in parallel to the windings 17, 18 and 26, 27 achieve an impedance matching with the lines 34 and 35, whereby any reflected wave can be effectively prevented from taking place in the AC loop circuit, in which case a circuit including the capacitor 31 functions as a bypass circuit which reduces the impedance of the power supply circuit 30.

Figure 3:
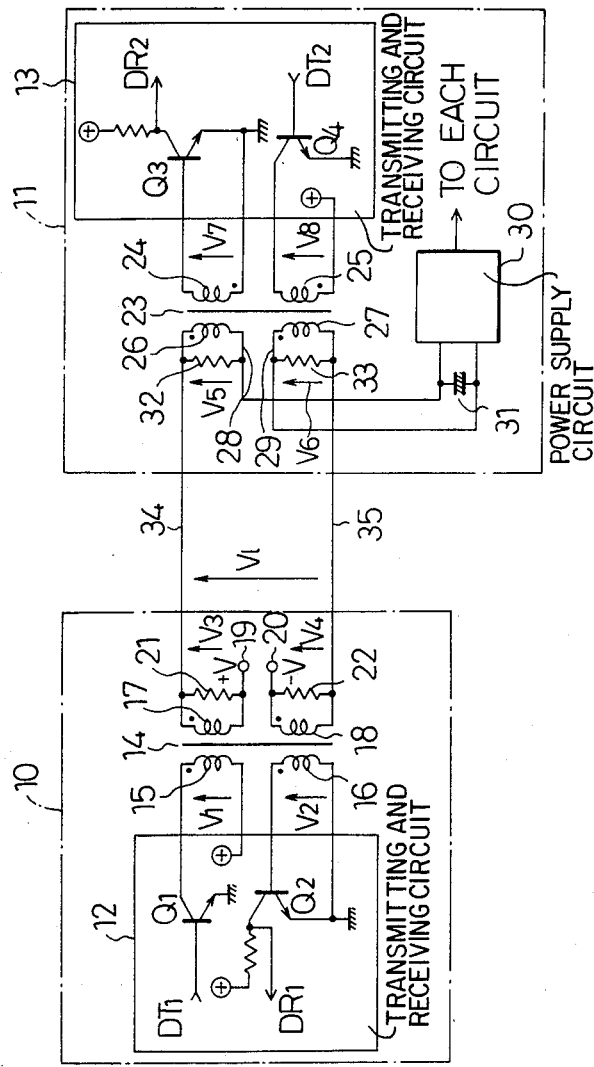
FIG. 3 shows more in detail the circuit of FIG. 2 in a practical arrangement.

Referring next to FIG. 3, there is shown an optimum example of practical arrangements for the transmitting circuit, wherein the transmitting and receiving circuits 12 and 13 of the main unit 10 and telephone set 11, respectively, employ a pair of transistors. More specifically, the transmitting and receiving circuits 12 and 13 include transistors Q1 or Q4, respectively, connected at the collector to one end of the windings 15 and 25 of the transformers 14 and 23, and transmission pulses DT1 and DT2 carrying data information can be applied to the base of the transistors Q1 and Q4, so that, the transistors Q1 and Q4 will form a so-called attraction type data output circuit, and the other ends of the windings 15 and 25 are connected to the positive terminals of the power source. Further, remaining transistors Q2 and Q3 of the transmitting and receiving circuits 12 and 13 are respectively connected at the emitter to the ground, and the winding 16 or 24 of the transformer 14 or 23 is connected between the base and emitter of the transistor Q2 or Q3 so that the emitter-grounded circuits of these transistors Q2 and Q3 can receive the data. Received data pulses DR1 and DR2 can be provided out of the respective collectors of the transistors Q2 and Q3 connected respectively through a resistance to the positive terminal of the power source. It will be readily understood by those skilled in the art that the transmitted data information can be properly processed in a known manner by CPU and the like incorporated in each of the main unit 10 and telephone set 11.

Figure 4:
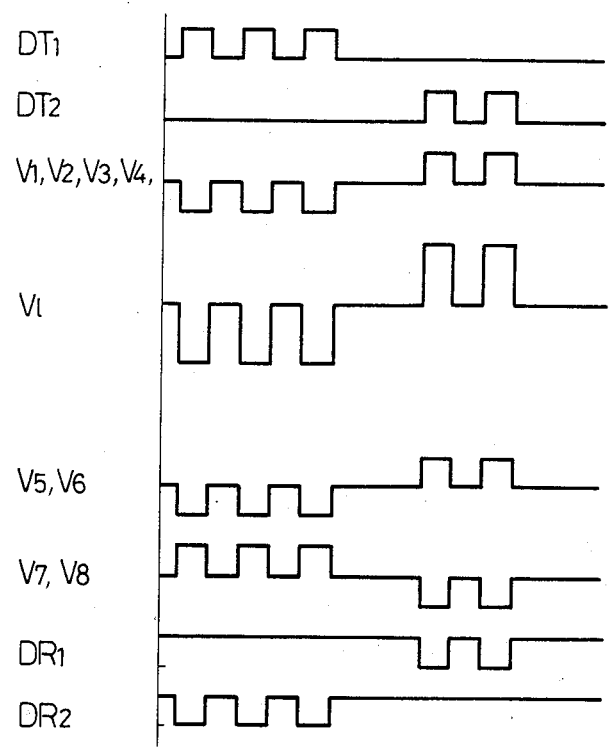
FIG. 4 shows waveforms appearing at various points in the transmitting circuit according to the present invention.

In the transmitting circuit arranged as shown in FIG. 3 according to the present invention, as will be clear from signal waveforms of FIG. 4 appearing respectively at a part of FIG. 3 given the same reference symbol, the winding arrangement for the transformers are so made that, specifically, the transmission pulse DT1 from the main unit 10 and the transmission pulse DT2 from the telephone set 11 have mutually opposite polarities on the lines 34 and 35 and the pulse which is transmitted either from the transmitting and receiving circuit 12 or 13 is also of opposite polarity to the pulse received at the other transmitting and receiving circuit 13 or 12, whereby the data transmission and reception can be carried out completely independently of each other without any erroneous detection.

Other arrangements and operation of the circuit of FIG. 3 than those described above are identical to those referred to with reference to the circuit of FIG. 2 and their description shall be omitted here.

The pulse/direct current transmitting circuit for the key telephone system according to the present invention can be subjected to various design modifications. For example, the transmitting and receiving circuit shown as a practical example in FIG. 3 may be replaced by, for example, an amplifier, comparator or the like available in the form of I.C.

What is claimed as my invention is:

1. An apparatus for transmitting pulse data and DC-source power concurrently over a pair of transmission lines in a key telephone system including a main operating unit and at least one key telephone set, said main operating unit and said telephone set each including a transformer and a pulse transmitting and receiving circuit having a pair of input terminals and a pair of output terminals; said transformer including a core, a first winding connected across said output terminals, a second winding connected across said input terminals, and a third winding and a fourth winding opposed to said first and second windings, respectively; said third winding of said main operating unit having one terminal connected with one terminal of a DC power source, and another terminal connected with a first line of said pair of transmission lines; said fourth winding of said main operating unit having one terminal connected with another terminal of said DC power source, and another terminal connected with a second line of said pair of transmission lines; said third winding of said telephone set having one terminal connected with said first line, and another terminal connected with one terminal of a power supply circuit; said fourth winding of said telephone set having one terminal connected with another terminal of said power supply circuit, and another terminal connected with said second line; said telephone set including a capacitor connected across the terminals of said power supply circuit, thereby to prevent the DC source power from short-circuiting across said third and fourth windings of said telephone set.

2. The apparatus of claim 1, wherein said power supply circuit and said capacitor have an AC impedance component small enough to form a closed-loop Ac circuit including said third and fourth windings of said main operating unit, said transmission lines, said third and fourth windings of said telephone set, and said capacitor, thereby to transmit said pulse data between said transmitting and receiving circuits of said main operating unit and said telephone set.

3. The apparatus of claim 1, wherein said third and fourth windings of said main operating unit, said pair of lines, and said third and fourth windings of said telephone set form a closed-loop DC circuit for supplying said DC source power from said DC power source.

4. The apparatus of claim 1, wherein each of said transmitting and receiving circuits includes a first transistor connected at the collector to said first winding and at the emitter to a reference potential point, the base of said first transistor controlled by said pulse data, and a second transistor connected at the base to said second winding, thereby providing at the collector received pulse data.

5. The apparatus of claim 1, wherein said transmission lines transmit said pulse data from said main operating unit in one polarity and from said telephone set in the opposite polarity.

* * * * *